United States Patent [19]

Mikami et al.

[11] Patent Number: 4,474,930

[45] Date of Patent: Oct. 2, 1984

[54] PRIMER COMPOSITIONS

[75] Inventors: Ryuzo Mikami; Katsuyoshi Nakasuji, both of Ichihara, Japan

[73] Assignee: Toray Silicone Company, Ltd., Tokyo, Japan

[21] Appl. No.: 517,316

[22] Filed: Jul. 25, 1983

[30] Foreign Application Priority Data

Jul. 29, 1982 [JP] Japan ................ 57-132377

[51] Int. Cl.$^3$ .......................................... C08F 283/00
[52] U.S. Cl. .................................. 525/507; 525/476; 525/523
[58] Field of Search .................. 525/476, 523, 507

[56] References Cited

U.S. PATENT DOCUMENTS

| 3,150,116 | 9/1964 | Masters | 525/523 |
| 3,154,597 | 10/1964 | McWhorter | 525/476 |
| 3,200,031 | 8/1965 | Rittenhouse | 525/523 |
| 4,233,428 | 11/1980 | Endo | 525/507 |
| 4,283,513 | 8/1981 | Mikami | 525/576 |
| 4,287,326 | 9/1981 | Mikami | 525/476 |
| 4,354,013 | 10/1981 | Kimura | 525/507 |

Primary Examiner—Melvyn I. Marquis
Attorney, Agent, or Firm—Robert Spector

[57] ABSTRACT

Silicone rubbers and silicone-modified organic rubbers are strongly adhered to various substrates using primer compositions comprising the combination of (1) a silicone-modified epoxy resin containing both epoxide and silicon-bonded alkoxy groups, and (2) an aminoalkylsilane.

8 Claims, No Drawings

PRIMER COMPOSITIONS

BACKGROUND OF THE INVENTION

1. Field of the Invention

This invention relates to a primer composition. More particularly, this invention relates to a primer composition which will strongly adhere a room temperature-curable silicone rubber or a room temperature-curable silicone-modified organic rubber to the surface of a substrate which is in contact with the rubber as it is curing.

2. Description of the Prior Art

Large amounts of room temperature-curable silicone rubber have recently been used as construction sealants because the durability of the rubber itself is far superior to the durability of other organic rubbers. Room temperature-curable silicone-modified organic rubbers have recently been developed and their application as construction sealants has been attempted. Various types of substrates are used in construction and include metals such as aluminum, steel, and stainless steel; coated building materials such as acrylic resin-coated, urethane resin-coated or epoxy resin-coated aluminums; hard inorganic building materials such as glass, tile and stone and porous inorganic substrates such as mortar, concrete, and autoclaved light weight concrete. For this reason, the strong adhesion of a room temperature-curable silicone rubber or a room temperature-curable silicone-modified organic rubber to the above-mentioned substrates is an important subject. In order to strongly adhere the substrate to the rubber, the substrate is usually treated with various primers and coated with a room temperature-curable silicone rubber or a room temperature-curable silicone-modified organic rubber followed by curing. However, among the above-mentioned substrates, pure aluminum, surface-treated aluminum, stainless steel, various resin-coated aluminums, and mortar are not good substrates for adhesion, with the result that a silicone rubber sealant or silicone-modified rubber sealant will peel at the interface with the substrate before it will degrade or lose its rubber elasticity. For this reason, the development of a primer which exhibits a long-term high adhesive strength, particularly a long-term high adhesive strength when immersed in water, is in demand.

A primer composition composed of an epoxy resin and an aminoalkylalkoxysilane is disclosed in Example 9 of Japanese Kokai No. 53-79929, published July 14, 1978 to Toshiba Silicone K.K., and naming as inventors I. Endo and C. Shimizu; however, this primer composition exhibits poor adhesiveness and gels in a short period of time due to the high reactivity of the amino groups of the aminoalkylalkoxysilane with the epoxy groups of the epoxy resin. Thus, it suffers from the drawback of no storage stability. Various methods were investigated by the present inventors in order to develop a primer composition which would provide strong and long-term adhesion between a room temperature-curable silicone rubber or a room temperature-curable silicone-modified organic rubber and various substrates, and which would itself exhibit excellent storage stability. The primer composition of this invention was developed as a result of this investigation.

SUMMARY OF THE INVENTION

The primer compositions of this invention comprise the combination of a silicone-modified epoxy resin containing both epoxide and silicon-bonded alkoxy groups with an aminoalkylsilane. The silicone-modified epoxy resin is a reaction product of an alkoxysilane and a hydroxylated epoxy resin.

DETAILED DESCRIPTION OF THE INVENTION

This invention provides a primer composition comprising (A) 100 parts by weight of a silicone-modified epoxy resin possessing epoxy groups and silicon-bonded alkoxy groups and which is produced by the condensation reaction of (a) an alkoxy substituted silane or an alkoxy substituted polysiloxane with the average unit formula $R_a^1SiX_bO_{(4-a-b)/2}$ where $R^1$ represents methyl or ethyl, X represents an alkoxy group, a is from 0 to 2, inclusive, b is from 1 to 4, inclusive, and the sum of a and b is from 1 to 4, inclusive, with (b) an epoxy resin containing epoxy and hydroxyl groups in each molecule, wherein the ratio of equivalents of alkoxy groups in component (a) to equivalents of hydroxyl groups in component (b) is at least 1:1, component (a) contains at least 2 alkoxy groups and component (A) contains at least 3 alkoxy groups, and (B) from 80 to 250 parts by weight of a silane of the general formula

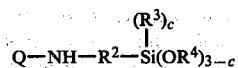

where $R^2$ represents a bivalent hydrocarbon radical, Q represents hydrogen, an alkyl radical, or an aminoalkyl radical, $R^3$ and $R^4$ represent monovalent hydrocarbon radicals, and c is 0 or 1.

In the foregoing formula for component (a), which is a starting material for component (A), $R^1$ represents a methyl or ethyl radical. X represents an alkoxy group such as methoxy, ethoxy, propoxy, or methoxyethoxy. Component (a) may be free of $R^1$ because a can be zero. The reason why the maximum value for a is 2 and the minimum value for b is 1 is as follows. When the number of alkoxy groups in component (a) is too low, a low degree of condensation with the hydroxyl groups of component (b) will occur, the number of silicon-bonded alkoxy groups in component (A) will be too low to adequately cure the primer and the primer will not exhibit sufficient adhesiveness. For this reason, the number of alkoxy groups in component (a) is at least 2 and the number of alkoxy groups in component (A) is at least 3.

Component (a) may be a silane or a polysiloxane, and the silane may be a monosilane or disilane. The degree of polymerization of any polysiloxane should not be very large; however it should be at least 2. The molecular configuration of the polysiloxane can be a linear or branched chain or a crosslinked network, and it may contain a small quantity of hydroxyl groups, halogen atoms or hydrogen atoms bonded to silicon. Specific embodiments of component (a) include methyltrimethoxysilane, dimethyldiethoxysilane, ethyltriethoxysilane, tetramethoxysilane, tetraethoxysilane, tetrapropoxysilane, tetrabutoxysilane, the partial hydrolysis condensation products of any of the foregoing silanes, ethyl polysilicates, and mixtures of these compounds. Low molecular weight organoalkoxysilanes such as methyltrimethoxysilane and ethyltrimethoxysilane are preferred due to the ease with which these compounds react with the hydroxyl groups of the epoxy resin.

The epoxy resin comprising component (b), which is the other starting material for component (A), can be of the bisphenol or novolak type as long as each molecule contains at least one hydroxyl group and at least one epoxy group. A bisphenol type epoxy resin is preferred. A particularly preferred epoxy resin is the condensation product of epichlorohydrin with bisphenol A, which can be represented by the general formula

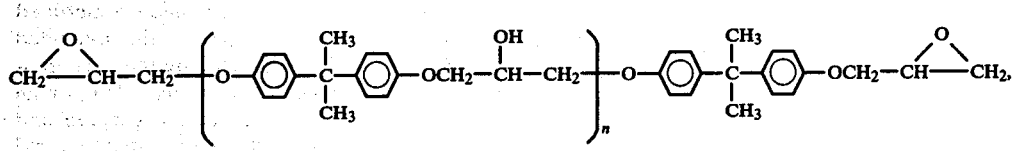

where n is an integer from 1–19.

The hydroxyl equivalent weight specified in accordance with the present invention is equal to the average molecular weight of the epxoy resin divided by the average number of hydroxyl groups per molecule of resin. The hydroxyl equivalent weight of the resin should be at least 300 g. per equivalent, preferably from 340 to 550 g. per equivalent. When the hydroxyl equivalent weight is greater than 550, component (b) cannot be significantly modified with the silicon compound and the formation of an adequate film is difficult. When the hydroxyl equivalent weight is less than 300, the hydroxyl groups which tend to remain unreacted under the usual conditions for the reacton of component (a) with component (b) reduce the storage stability of the composition obtained by mixing component (A) with component (B), as evidenced by an increase in viscosity or gelation.

The epoxy equivalent weight of (b) should be from 180 to 4000 and the average molecular weight should be from 300 to 6000 g./mol, preferably from 700 to 2000 g./mol.

Component (A) can be prepared by heating a mixture of components (a) and (b) at a temperature above the boiling point of the alcohol to be eliminated in order to condense the alkoxy groups of component (a) with the hydroxyl groups of component (b) with the formation of an alcohol as a by-product. This reaction will usually occur readily at temperatures of 80°–160° C. in the absence or presence of a small amount of a condensation reaction catalyst when the by-product alcohol is removed from the system. A solvent or diluent may be employed for this reaction, including organic solvents such as toluene, xylene, and ethyl acetate. It is considered critical that none of the hydroxyl groups initially present in the epoxy resin remain unreacted. For this reason, a small amount of a condensation reaction catalyst is advantageously employed.

The condensation reaction of component (a) with component (b) should be conducted under conditions such that the ratio of the number of equivalents of alkoxy groups in component (a) to the number of equivalents of hydroxyl groups in component (b) is at least 1:1. When this ratio is less than 1:1, the reaction mixture tends to gel during the condensation reaction. The degree of gelation declines as the above-mentioned ratio increases.

The number of equivalents of alkoxy groups in component (a) is defined as the number of equivalents of silicon-bonded alkoxy groups present in the amount, in grams, of component (a) employed for the reaction of component (a) with component (b). For example, 0.10 equivalents of alkoxy groups are present in 4.5 g. of methyltrimethoxysilane. One mole of this silane weighs 136 g. and a molecule of this silane contains 3 alkoxy groups. Thus, 1 mole (136 g.) of this silane contains 3 equivalents of alkoxy groups, and 4.5 g. of the silane contains 3 equivalents×4.5 g/136 g.=0.10 equivalent of alkoxy groups. The number of equivalents of hydroxyl groups in component (b) is defined as the number of equivalents of alcoholic hydroxyl groups present in that amount, in grams, of component (b) employed for the reaction of component (a) with component (b).

Component (B) enhances drying of the primer composition under ambient conditions. It also increases both the degree of adhesion to the substrate, and the durability of the adhesion, particularly the durability of the adhesion in the presence of water, exhibited by a room temperature-curable silicone rubber or a room temperature-curable silicone-modified organic rubber which has been coated on a film formed from the primer composition of this invention.

When the relative concentration of component (B) is less than 80 parts by weight per 100 parts by weight of component (A), the resulting primer composition will not exhibit storage stability or an increase in the durability of adhesion. On the other hand, an excessive concentration of component (B) also reduces the storage stability. For this reason, the relative concentrations of (B) is from 80 to 250 by weight, preferably from 100 to 200 parts by weight, per 100 parts by weight of component (A).

Examples of component (B) include

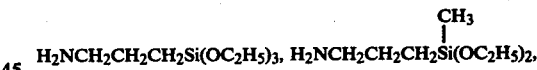

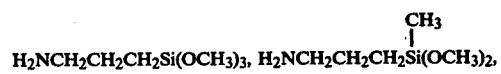

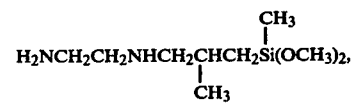

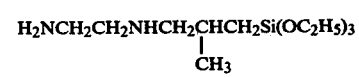

-continued

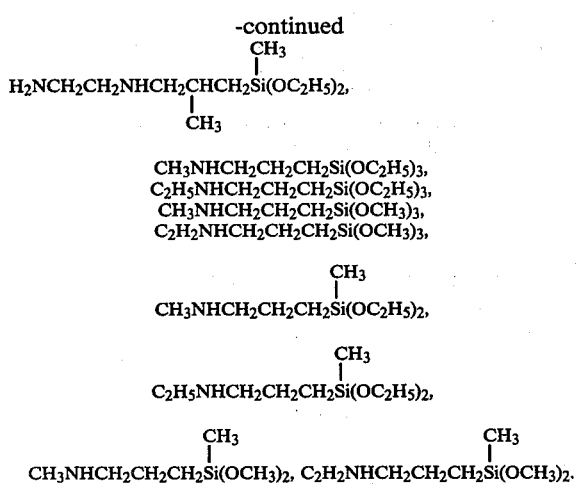

$CH_3NHCH_2CH_2CH_2Si(OC_2H_5)_3$,
$C_2H_5NHCH_2CH_2CH_2Si(OC_2H_5)_3$,
$CH_3NHCH_2CH_2CH_2Si(OCH_3)_3$,
$C_2H_2NHCH_2CH_2CH_2Si(OCH_3)_3$, $$CH_3NHCH_2CH_2CH_2\underset{\underset{CH_3}{|}}{Si}(OC_2H_5)_2,$$

$$C_2H_5NHCH_2CH_2CH_2\underset{\underset{CH_3}{|}}{Si}(OC_2H_5)_2,$$

$$CH_3NHCH_2CH_2CH_2\underset{\underset{CH_3}{|}}{Si}(OCH_3)_2, \quad C_2H_2NHCH_2CH_2CH_2\underset{\underset{CH_3}{|}}{Si}(OCH_3)_2.$$

The primer composition of this invention can be easily produced by simply mixing the aforementioned components (A) and (B). When coating the primer composition of this invention on a substrate, the primer composition may be diluted with an organic solvent which can dissolve the primer composition if the composition's viscosity is high or if it is desired to apply a thin film. Typical organic solvents include toluene, xylene, and ethyl acetate. When the viscosity of the primer composition is too low or application of a thick film is desired, various inorganic fillers such as ultrafine silica powder can be added to the primer composition. A preferred filler is a hydrophobic silica filler whose surface has been trimethylsilylated. In addition, known heat stabilizers, pigments, and other additives can be added as long as they do not adversely affect the purpose of this invention. Typical additives are organosilicon compounds other than the components (A) and (B), such as unreacted component (a) other organotrialkoxysilanes, such as mercaptoalkyltrialkoxysilanes, epoxy group-containing orgaotrialkoxysilanes, methacryloxyalkyltrialkoxysilanes, vinyltrialkoxysilanes, and allyltrialkoxysilanes. Other additives include red iron oxide, cerium oxide, aliphatic acid salts of iron, and titanium oxide.

The primer composition of this invention is a single-package type which exhibits excellent storage stability and dries rapidly under ambient conditions. It can strongly and durably adhere a room temperature-curable silicone rubber or a room temperature-curable silicone-modified organic rubber to various substrates when the rubber is brought into contact with the substrate and cured. Because this primer can exhibit excellent durability of adhesion during long-term immersion in cold or hot water, it is very appropriate as a pretreatment agent for substrates. The room temperature-curable silicon rubber may be a one-package or two-package type and may liberate an alcohol, oxime, ketone, amine, hydroxylamine or carboxylic acid as a by-product of the curing reaction. The room temperature-curable silicone-modified organic rubber may also be a one-package or two-package type. This class of materials includes polyether rubbers in which both ends have been alkoxysilylated, butadiene rubbers in which both ends have been alkoxysilylated, and polyurethane rubbers in which both ends have been alkoxysilylated.

When a poorly adhering substrate such as pure aluminum, surface-treated aluminum, painted aluminum, stainless steel, mortar, or concrete is pretreated with the primer composition of this invention, it can be strongly and durably adhered to the above-mentioned rubbers or other elastic sealant so that the sealing of joints between the contact sections of different substrates of a building can be smoothly executed.

This invention will be explained using demonstrational examples. The viscosity values reported in the examples were measured at 25° C. and "parts" denotes "parts by weight."

REFERENCE EXAMPLE 1

A 2 liter capacity, three-necked flask equipped with a stirrer, reflux condenser and thermometer was charged with 450 g. of a bisphenol type epoxy resin available as Epikote 1001 from the Shell Chemical Co., Ltd.; 1050 g. of methyltrimethoxysilane available as SH6070 silane from Toray Silicone Company, Ltd. and 1.0 g. of a tetrabutyl titanate. The epoxy resin contained 1.00–1.11 equivalents of hydroxyl groups, exhibited an average molecular weight of 900–1,000, a hydroxyl equivalent weight of 450–500 g./equivalent and an epoxide equivalent weight of 450–525 g./equivalent. The methyltrimethoxysilane contained 23.2 equivalents of methoxy groups, and the molar ratio of alkoxy groups in the silane to hydroxyl groups in the epoxy resin was 20.9–23.2. A condensation reaction was conducted by heating the resulting mixture at the reflux temperature (88°–100° C.) with stirring. The initially opaque reaction mixture gradually became transparent. The reaction mixture was heated at the boiling point for 5 hours while the methyl alcohol by-product and unreacted methyltrimethoxysilane were both removed from the reaction mixture through a distillation tube. Following completion of the reaction, part of the unreacted methyltrimethoxysilane was distilled off to yield 1239.6 parts of a light yellow transparent liquid containing 41.1% by weight of nonvolatile materials. The nonvolatiles were analyzed by gel permeation chromatography and infrared absorption spectroscopy and were found to be a silicone-modified epoxy resin possessing epoxy groups and methoxy groups which had been produced by the condensation reaction of the hydroxyl groups of the epoxy resin with the methoxy groups of the methyltrimethoxysilane. The volatiles were found to be methyltrimethoxysilane.

EXAMPLE 1

Mixtures of the silicone-modified epoxy resin solution prepared as described in Reference Example 1 and an aminosilane of the general formula

were stored at room temperature in sealed containers and examined after 24, 48, 72, and 140 hours for evidence of gellation. The amounts of resin and silane in each sample are disclosed in Table 1, together with the results of the examinations.

For comparison, 164.4 parts of the above-mentioned Epikote 1001 epoxy resin were dissolved in 235.6 parts ethyl acetate in order to obtain an epoxy resin solution containing 41.1 wt. % of nonvolatile materials. This solution was subsequently combined with the above-mentioned aminosilane in the amounts shown in Table 2. The resultant mixture was stored at room temperature in a sealed container and examined after 24 and 48 hours. The results are reported in Table 2. The data in Tables 1 and 2 demonstrate that the comparison primer compositions containing a silicone-modified epoxy resin and an insufficient amount of aminosilane gelled within 140 hours and the comparison primer compositions containing the unmodified epoxy resin solution and aminosilane gelled within 48 hours. By comparison, the primer composition of this invention containing the silicone-modified epoxy resin solution and an amount of aminosilane within the present limits did not gel during 140 hours of storage.

TABLE 1
Storage Stability of Primer Compositions

| Sample No. | Silicone modified epoxy resin (parts) | Amino-silane (parts) | Storage Stability 24 | 48 | 72 | 140 (hrs) |
|---|---|---|---|---|---|---|
| 1 (Comparison) | 20 | 4.8 | O | O | O | X |
| 2 (Comparison) | 20 | 6.0 | O | O | O | X |
| 3 (Invention) | 20 | 7.2 | O | O | O | O |
| 4 (Invention) | 20 | 8.4 | O | O | O | O |
| 5 (Invention) | 20 | 9.6 | O | O | O | O |
| 6 (Invention) | 20 | 10.8 | O | O | O | O |
| 7 (Invention) | 20 | 11.0 | O | O | O | O |
| 8 (Invention) | 20 | 13.2 | O | O | O | O |
| 9 (Invention) | 20 | 14.4 | O | O | O | O |

O = No change
X = Gelation

TABLE 2
Storage Stability of Primer Compositions (Comparison)

| Sample No. | Epoxy resin solution (parts) | Aminosilane (parts) | Storage Stability 24 | 48 (hrs) |
|---|---|---|---|---|
| 10 | 20 | 4.1 | X | — |
| 11 | 20 | 5.4 | X | — |
| 12 | 20 | 6.8 | O | X |
| 13 | 20 | 8.1 | O | X |
| 14 | 20 | 9.5 | O | X |
| 15 | 20 | 10.8 | O | X |
| 16 | 20 | 12.2 | O | X |
| 17 | 20 | 13.5 | O | X |
| 18 | 20 | 14.9 | O | X |
| 19 | 20 | 16.2 | O | X |
| 20 | 20 | 17.6 | O | X |

O = No change in appearance
X = Gelation

The silicone-modified epoxy resin solution produced in Reference Example 1 was combined with the aminosilane $H_2NCH_2CH_2NH(CH_2)_3Si(OCH_3)_3$, the epoxysilane

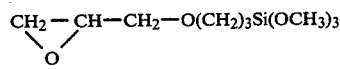

and/or the mercaptosilane $HS(CH_2)_3Si(OCH_3)_3$ and ethyl acetate (mixing ratios shown in Table 3) to produce 8 primers. Each primer was coated on 25×50×50 mm mortar blocks and 1.0×50×50 mm stainless steel plates and cured at 20° C. for 1 hour under ambient conditions. Two specimens of each primer-coated surface were then coated with a hydroxylamine-liberating room temperature-curable silicon rubber (SH792 Sealant from Toray Silicone Co., Ltd.) and adhered to give adhesion test specimens. One adhesion test specimen was cured at room temperature for 14 days and then at 50° C. for 7 days. The other adhesion test specimen was cured at room temperature for 14 days, then at 50° C. for 7 days and then immersed in hot water at 50° C. for 7 days. The tensile adhesive strength of each adhesion test specimen was measured using a commercial tensile tester and a jaw separation rate of 50 mm/min. The adhesion test specimens were prepared by the method of paragraph 5.12 JIS A-5758, published by the Japan Industrial Standards Committee. These test results are reported in Table 4. These results demonstrated that primers 21-26 all exhibited a strong adhesion between mortar block (or stainless steel plate) and the room temperature-curable silicone rubber, and the durability of adhesion was excellent. In the comparison examples, both primer 27 containing only the silicone-modified epoxy resin and primer 28 containing only the aminosilane exhibited a weak initial adhesive strength and were found to lose their adhesive strength following immersion in hot water, resulting in the occurrence of peeling at the interface.

TABLE 3

| | Primer Compositions | | | | |
|---|---|---|---|---|---|
| Sample No. | Silicone-modified epoxy resin solution (parts) | Aminosilane (parts) | Epoxysilane (parts) | Mercaptosilane (parts) | Ethyl Acetate (parts) |
| 21 (invention) | 20 | 7.2 | 0 | 0 | 30 |
| 22 (invention) | 20 | 11 | 0 | 0 | 30 |
| 23 (invention) | 20 | 11 | 8 | 0 | 30 |
| 24 (invention) | 20 | 11 | 0 | 8 | 30 |
| 25 (invention) | 20 | 11 | 8 | 8 | 30 |
| 26 (invention) | 20 | 11 | 4 | 4 | 30 |
| 27 (comparison) | 20 | 0 | 0 | 0 | 30 |
| 28 (comparison) | 0 | 11 | 0 | 0 | 30 |

TABLE 4
Adhesion Test Results

| Sample No. | Substrate | Initial Stage $M_{50}$ | $T_{max}$ | $E_{max}$ | After Immersion in Hot Water in 50° C. $M_{50}$ | $T_{max}$ | $E_{max}$ |
|---|---|---|---|---|---|---|---|
| (Invention) 21 | Mortar | 0.13 | 0.60 | 821 | 0.12 | 0.46 | 710 |
| | Stainless Steel | 0.13 | 0.77 | 941 | 0.13 | 0.76 | 924 |
| (Invention) 22 | Mortar | 0.13 | 0.66 | 838 | 0.12 | 0.45 | 700 |
| | Stainless Steel | 0.13 | 0.77 | 945 | 0.13 | 0.77 | 936 |
| (Invention) 23 | Mortar | 0.13 | 0.65 | 806 | 0.13 | 0.54 | 750 |
| | Stainless Steel | 0.13 | 0.79 | 950 | 0.13 | 0.73 | 945 |
| (Invention) 24 | Mortar | 0.13 | 0.65 | 796 | 0.12 | 0.52 | 765 |
| | Stainless Steel | 0.13 | 0.73 | 916 | 0.12 | 0.77 | 980 |
| (Invention) 25 | Mortar | 0.13 | 0.69 | 845 | 0.13 | 0.54 | 716 |
| | Stainless Steel | 0.13 | 0.82 | 978 | 0.13 | 0.65 | 846 |
| (Invention) 26 | Mortar | 0.13 | 0.65 | 800 | 0.13 | 0.65 | 831 |
| | Stainless Steel | 0.13 | 0.79 | 963 | 0.13 | 0.76 | 962 |
| (Comparison) 27 | Mortar | 0.13 | 0.24 | 310 | (4)- | — | — |
| | Stainless Steel | 0.13 | 0.18 | 160 | (4)- | — | — |
| (Comparison) 28 | Mortar | 0.12 | 0.16 | 150 | (4)- | — | — |
| | Stainless | 0.12 | 0.17 | 137 | (4)- | — | — |

TABLE 4-continued

Adhesion Test Results

| Sample No. | Substrate | Initial Stage | | | After Immersion in Hot Water in 50° C. | | |
|---|---|---|---|---|---|---|---|
| | | $M_{50}$ | $T_{max}$ | $E_{max}$ | $M_{50}$ | $T_{max}$ | $E_{max}$ |
| | Steel | | | | | | |

(1) $M_{50}$ = Tensile stress at 50% elongation (MPa)
(2) $T_{max}$ = Maximum tensile stress (MPa)
(3) $E_{max}$ = Elongation at maximum tensile stress (%)
(4) Peeling at interface before measurement

EXAMPLE 2

Primers 22 and 26 of Example 1 were allowed to stand at room temperature for 2 months in sealed containers after their preparation. The durability of adhesion of the resulting samples was tested by the methods of Example 1. For comparison, primers 29 and 30 were prepared from a bisphenol-type epoxy resin, Epikote 828 from Shell Chemical Co., Ltd., average molecular weight, 390, a hydroxyl equivalent weight of from 450 to 500 g. and an epoxide equivalent weight of 450 to 525 g., the epoxysilane

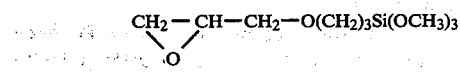

the mercaptosilane $HS(CH_2)_3Si(OCH_3)_3$, the aminosilane $H_2N(CH_2)_2NH(CH_2)_3Si(OCH_3)_3$, ethyl acetate and toluene (mixing ratio shown in Table 5) and were evaluated using methods identical to those mentioned above. The test results are reported in Table 6.

Primers 22 and 26, which were produced from a silicone-modified epoxy resin of this invention, exhibited excellent adhesion even after standing for 2 months. On the other hand, primers 29 and 30, which were produced from the epoxy resin of the comparison example, were found to exhibit poor adhesion to a mortar block or stainless steel plate after immersion in warm water.

TABLE 5

| | Primer Compositions | |
|---|---|---|
| Component | (Comparison) Sample 29 | (Invention) Sample 30 |
| Epikote 828 | 3 | 3 |
| Ethyl acetate | 20.0 | 20.0 |
| Toluene | 15.0 | 15.0 |
| Epoxysilane | 4.0 | 0 |
| Aminosilane | 8.0 | 8.0 |
| Mercaptosilane | 15.0 | 0 |

TABLE 6

Adhesion Test Results

| Sample No. | Substrate | Initial Stage | | | After Immersion in Hot Water in 50° C. | | |
|---|---|---|---|---|---|---|---|
| | | $M_{50}$ | $T_{max}$ | $E_{max}$ | $M_{50}$ | $T_{max}$ | $E_{max}$ |
| (Invention) 22 | Mortar | 0.13 | 0.68 | 841 | 0.12 | 0.44 | 700 |
| | Stainless Steel | 0.13 | 0.76 | 937 | 0.13 | 0.76 | 925 |
| (Invention) 26 | Mortar | 0.13 | 0.73 | 883 | 0.13 | 0.49 | 746 |
| | Stainless Steel | 0.14 | 0.80 | 963 | 0.13 | 0.68 | 938 |
| (Comparison) 29 | Mortar | 0.13 | 0.66 | 831 | 0.12 | 0.12 | 50 |
| | Stainless Steel | 0.13 | 0.43 | 613 | — | 0.79 | 23 |
| (Comparison) 30 | Mortar | 0.13 | 0.65 | 831 | 0.12 | 0.17 | 150 |
| | Stainless | 0.13 | 0.66 | 861 | 0.12 | 0.20 | 197 |

TABLE 6-continued

Adhesion Test Results

| Sample No. | Substrate | Initial Stage | | | After Immersion in Hot Water in 50° C. | | |
|---|---|---|---|---|---|---|---|
| | | $M_{50}$ | $T_{max}$ | $E_{max}$ | $M_{50}$ | $T_{max}$ | $E_{max}$ |
| | Steel | | | | | | |

EXAMPLE 3

A primer was prepared by the method used for sample 22 of Example 1 with the exception that γ-aminopropyltriethoxysilane was used instead of the aminosilane. This primer was coated on 4 mortar test specimens and on 4 aluminum test specimens and then cured at room temperature for 4 hours under ambient conditions. The primer-coated surfaces of 2 specimens of each type were coated with a room temperature-curable silicone rubber (an oxime-liberating single-package silicone sealant, SH9145 Sealant from Toray Silicone Co., Ltd.) and then adhered to the remaining specimens. The resulting test specimens were peeled from each other after curing at room temperature for 14 days. The results showed that every test specimen underwent failure in the rubber layer and the fracture surface showed 100% cohesive failure.

EXAMPLE 4

A 100 g. portion of an allyl-terminated oxypropylene polymer exhibiting an average molecular weight of 400, 23 g. of methyldimethoxysilane and 0.006 g. of a platinum-ethylene complex were combined in an autoclave under a nitrogen atmosphere. The resulting mixture was agitated at 100° C. for 1 hour, at which time it was combined with 120 g. calcium carbonate, 40 g. fume silica filler, 40 g. dioctyl phthalate and 2 g. dibutyltin dilaurate to prepare an alkoxysilyl-terminated polyether-type room temperature-curable rubber.

Primer sample 22 from Example 1 was coated on 2 mortar test specimens and on 2 aluminum test plates and then cured at room temperature for 4 hours under ambient conditions. The above-mentioned room temperature-curable rubber was applied between the primer-coated surfaces of two test specimens of the same type and cured at room temperature for 14 days. The two specimens were then peeled away from each other. The results showed that every test specimen underwent failure in the rubber layer and the fracture surface showed 100% cohesive failure.

EXAMPLE 5

An alkoxysilyl-terminated room temperature curable rubber was prepared by combining 70 parts by weight of a 20 wt. % xylene solution of a hydroxy-terminated curable polybutadiene with 0.2 part by weight of the silane $(CH_3O)_3SiCH_2CH(CH_3)CH_2SH$ and then heating at 100° C. for 24 hours to form a polybutadiene in which both ends of the molecule have been alkoxysilylated. This modified polybutadiene was combined with 1.62 part by weight methyltrimethoxysilane and 0.82 part by weight of titanium acetonylacetate.

Primer sample 21 from Example 1 was coated on 2 mortar test specimens and 2 aluminum test plates and then cured at room temperature for 4 hours under ambient conditions. The above-mentioned room temperature-curable rubber was applied between the primer-coated surfaces of two test specimens of the same type, cured for 14 days and the two test specimens were then peeled from each other. The results showed that every test specimen underwent failure in the rubber layer and the fracture surface showed 100% cohesive failure.

EXAMPLE 6

A silicone-modified epoxy resin solution was prepared by the method of Reference Example 1 with the exception that 1,050 g. of ethyl trisilicate containing 17.5 g. equivalent weights of ethoxy groups was used instead of the methyltrimethoxysilane used in Reference Example 1. The reaction mixture was heated under reduced pressure to remove the unreacted ethyl trisilicate. The quantity of residual nonvolatiles was 98 wt. %. This residue was combined with toluene to give a nonvolatiles of 50 wt. %.

The toluene solution (100 parts) of this silicone-modified epoxy resin was combined with 120 parts of N-ethyl-ε-aminopropyltrimethoxysilane and 120 parts of ethyl acetate to prepare a primer composition. This primer composition did not gel even after storage in a sealed container at room temperature for 2 months. This primer was subjected to an adhesion test by the methods of Example 1. This primer exhibited an excellent initial adhesion and durability of adhesion, both of which were similar to those of primer 22.

That which is claimed is:

1. A primer composition consisting essentially of
   (A) 100 parts by weight of a silicone-modified epoxy resin posessing epoxy groups and silicon-bonded alkoxy groups and which is produced by the condensation reaction of
   (a) an alkoxy substituted silane or an alkoxy substituted polysiloxane with the average unit formula $R^1SiX_bO_{(4-a-b)/2}$ where $R^1$ represents methyl or ethyl, X represents an alkoxy group, a is from 0 to 2, inclusive, b is from 1 to 4, inclusive, with
   (b) an epoxy resin containing epoxy and hydroxyl groups in each molecule,
   wherein the ratio of equivalents of alkoxy groups in component (A) to equivalents of hydroxy groups in component (b) is at least 1:1, component (a) contains at least 2 alkoxy groups and component (A) contains at least 3 alkoxy groups, and
   (B) from 80 to 250 parts by weight of a silane of the general formula

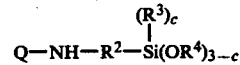

where $R^2$ represents a bivalent hydrocarbon radical, Q represents hydrogen, an alkyl radical, or an aminoalkyl radical, $R^3$ and $R^4$ represent monovalent hydrocarbon radicals, and c is 0 or 1.

2. A primer composition according to claim 1 where the hydroxyl equivalent weight of (b) is at least 300 g. per equivalent, the epoxide equivalent weight of (b) is from 180 to 4,000 g. per equivalent and the average molecular weight of (b) is from 300 to 6000 g. per mol.

3. A primer composition according to claim 1 where the epoxy resin exhibits an average molecular weight of from 700 to 2000 g. per mol and a hydroxyl equivalent weight of from 340 to 550 g. per equivalent.

4. A primer composition according to claim 2 where said epoxy resin is a condensation product of bisphenol A and epichlorohydrin.

5. A primer composition according to claim 1 where said composition contains from 100 to 200 parts by weight of (B) per 100 parts by weight of (A).

6. A primer composition according to claim 1 where $R^1$ is methyl and X is methoxy.

7. A primer composition according to claim 1 where $R^4$ is methyl, c is 0 or 1, $R^3$ is methyl when c is 1, Q is β-aminoethyl, hydrogen or ethyl and $R^2$ is n-propylene.

8. A primer composition according to claim 1 where said composition contains, in addition to (A) and (B) at least one silane selected from the group consisting of mercaptoalkyltrialkoxysilanes, epoxy group-containing organotrialkoxysilanes, methacroyloxyalkyltrialkoxysilanes, vinyltrialkoxysilanes and allyltrialkoxysilanes.

* * * * *

UNITED STATES PATENT AND TRADEMARK OFFICE
CERTIFICATE OF CORRECTION

PATENT NO. : 4,474,930
DATED : October 2, 1984
INVENTOR(S) : Ryuzo Mikami et al.

It is certified that error appears in the above-identified patent and that said Letters Patent is hereby corrected as shown below:

Column 7, line 13, -- Component -- should be inserted over the headings of columns 2 and 3 in "Table 1".

Column 11, line 18, "$\epsilon$" should read -- $\gamma$ --.

Signed and Sealed this

Seventh Day of May 1985

[SEAL]

Attest:

DONALD J. QUIGG

Attesting Officer     Acting Commissioner of Patents and Trademarks

UNITED STATES PATENT AND TRADEMARK OFFICE
CERTIFICATE OF CORRECTION

PATENT NO.   :   4,474,930
DATED        :   October 2, 1984
INVENTOR(S)  :   Ryozu Mikami and Katsuyoshi Nakasuji It is certified that error appears in the above-identified patent and that said Letters Patent is hereby corrected as shown below:

In column 3, line 29, "reacton" should read -- reaction --.

In column 11, line 34 "$R^1SiX_bO_{(4-a-b)/2}$" should read

-- $R^1_a SiX_b O_{(4-a-b)/2}$ -- .

In column 11, line 40, "(A)" should read --(a)-- .

Signed and Sealed this

Sixteenth Day of July 1985

[SEAL]

Attest:

DONALD J. QUIGG

Attesting Officer

Acting Commissioner of Patents and Trademarks